United States Patent
Deshmukh et al.

(10) Patent No.: US 8,386,254 B2
(45) Date of Patent: Feb. 26, 2013

(54) MULTI-CLASS CONSTRAINED MAXIMUM LIKELIHOOD LINEAR REGRESSION

(75) Inventors: Neeraj Deshmukh, Waltham, MA (US); Puming Zhan, Acton, MA (US)

(73) Assignee: Nuance Communications, Inc., Burlington, MA (US)

( * ) Notice: Subject to any disclaimer, the term of this patent is extended or adjusted under 35 U.S.C. 154(b) by 1133 days.

(21) Appl. No.: 12/114,005

(22) Filed: May 2, 2008

(65) Prior Publication Data

US 2009/0024390 A1 Jan. 22, 2009

Related U.S. Application Data

(60) Provisional application No. 60/915,971, filed on May 4, 2007.

(51) Int. Cl.
*G10L 15/20* (2006.01)
*G10L 15/02* (2006.01)
(52) U.S. Cl. .................. 704/251; 704/256; 704/254
(58) Field of Classification Search ........... 704/200–278
See application file for complete search history.

(56) References Cited

U.S. PATENT DOCUMENTS

| | | | | |
|---|---|---|---|---|
| 5,193,142 A | 3/1993 | Zhao | ............................ | 704/200 |
| 5,450,523 A | 9/1995 | Zhao | ............................ | 704/243 |
| 5,715,367 A | 2/1998 | Gillick et al. | ................... | 704/254 |
| 5,754,681 A | 5/1998 | Watanabe et al. | ............... | 382/159 |
| 5,864,810 A | 1/1999 | Digalakis et al. | .............. | 704/255 |
| 5,970,239 A | 10/1999 | Bahl et al. | ...................... | 704/245 |
| 6,112,175 A * | 8/2000 | Chengalvarayan | ......... | 704/256.5 |
| 6,324,510 B1 | 11/2001 | Waibel et al. | .............. | 704/256.7 |
| 6,418,411 B1 | 7/2002 | Gong | .......................... | 704/256.5 |
| 6,421,641 B1 | 7/2002 | Huang et al. | ................... | 704/250 |
| 6,442,519 B1 | 8/2002 | Kanevsky et al. | .............. | 704/243 |
| 6,470,314 B1 * | 10/2002 | Dharanipragada et al. | ... | 704/231 |
| 6,789,061 B1 | 9/2004 | Fischer et al. | ................. | 704/240 |
| 6,799,162 B1 * | 9/2004 | Goronzy et al. | .............. | 704/244 |
| 6,999,926 B2 | 2/2006 | Yuk et al. | ........................ | 704/244 |
| 7,117,231 B2 | 10/2006 | Fischer et al. | ......................... | 1/1 |
| 7,216,077 B1 * | 5/2007 | Padmanabhan et al. | ....... | 704/240 |
| 7,269,555 B2 | 9/2007 | Yuk et al. | ....................... | 704/234 |
| 7,292,977 B2 | 11/2007 | Liu | ............................... | 704/236 |
| 7,457,745 B2 | 11/2008 | Kadambe et al. | ............. | 704/216 |
| 7,587,321 B2 | 9/2009 | Liu et al. | ..................... | 704/256.3 |

(Continued)

FOREIGN PATENT DOCUMENTS

| | | |
|---|---|---|
| EP | 1022725 A1 | 7/2000 |
| EP | 1197949 A1 | 4/2002 |

(Continued)

OTHER PUBLICATIONS

Matsoukas et al., "Improved Speaker Adaptation Using Speaker Dependent Feature Projections", Proc. IEEE Automatic Speech Recognition and Understanding Workshop, St. Thomas U.S. Virgin Islands, Nov. 2003, pp. 273-278.*

(Continued)

*Primary Examiner* — Jialong He
(74) *Attorney, Agent, or Firm* — Sunstein Kann Murphy & Timbers LLP

(57) ABSTRACT

A method of speech recognition converts an unknown speech input into a stream of representative features. The feature stream is transformed based on speaker dependent adaptation of multi-class feature models. Then automatic speech recognition is used to compare the transformed feature stream to multi-class speaker independent acoustic models to generate an output representative of the unknown speech input.

16 Claims, 2 Drawing Sheets

U.S. PATENT DOCUMENTS

| | | | |
|---|---|---|---|
| 7,668,718 B2 | 2/2010 | Kahn et al. | 704/270 |
| 7,672,847 B2 | 3/2010 | He et al. | 704/256.2 |
| 2002/0013861 A1 | 1/2002 | Adiletta et al. | 719/313 |
| 2002/0046024 A1 | 4/2002 | Kompe et al. | 704/236 |
| 2002/0091521 A1* | 7/2002 | Yuk et al. | 704/240 |
| 2002/0103639 A1* | 8/2002 | Chang et al. | 704/223 |
| 2003/0036904 A1* | 2/2003 | Chaudhari et al. | 704/250 |
| 2004/0015352 A1* | 1/2004 | Ramakrishnan et al. | 704/240 |
| 2004/0117183 A1* | 6/2004 | Deligne et al. | 704/248 |
| 2004/0172250 A1 | 9/2004 | Liu | 704/267 |
| 2004/0227183 A1 | 11/2004 | Negoro et al. | 704/248 |
| 2004/0267530 A1 | 12/2004 | He et al. | 704/256 |
| 2005/0228666 A1 | 10/2005 | Liu et al. | 704/256 |
| 2006/0149558 A1 | 7/2006 | Kahn et al. | 704/278 |
| 2007/0030044 A1 | 2/2007 | Yao | 704/256.3 |
| 2007/0129943 A1 | 6/2007 | Lei et al. | 704/240 |
| 2008/0004876 A1* | 1/2008 | He et al. | 704/243 |

FOREIGN PATENT DOCUMENTS

| | | |
|---|---|---|
| WO | WO 0068933 | 11/2000 |

OTHER PUBLICATIONS

Li et al., "Incremental On-Line Feature Space MLLR Adaptation for Telephony Speech Recognition", International Conference on Spoke Langauge Processing (ICSLP), 2002.*

Delaney et al. "A Low-Power, Fixed-Point, Front-End Feature Extraction for a Distributed Speech Recognition System", IEEE, ICASSP, 2002.*

Gales, "Maximum Likelihood Linear transformation for HMM-based speech recogntion", Tech. Report, CUED/FINFENG/TR291, Cambridge Univ., 1997.*

Doh, et al, "Inter-Class MLLR for Speaker Adaptation", *Accoustics, Speech and Signal Processing*, 2000, ICASSP '00. Proceedings. 2000 IEEE International Conference on Jun. 5-9, 2000, Piscataway, NJ, USA, IEEE, vol. 3, Jun. 5, 2000, pp. 1543-1546, XP010507646, ISBN: 978-0-7803-6293-2, p. 1543.

Gales, M. J. F., "Maximum likelihood linear transformations for HMM-based speech recognition", *Computer Speech and Language*, Elsevier, London GB, vol. 12, No. 2, Apr. 1, 1998, pp. 75-98, XP004418764, ISSN: 0885-2308.

Li, et al, "Incremental On-Line Feature space MLLR Adaptation for Telephony speech Recognition", *ICSLP 2002*: 7*th* International Conference on Spoken Language Processing, Sep. 16, 2002, p. 1417-1420, XP007011703, Denver, Colorado, ISBN: 978-1-876346-40-9.

Matsoukas, et al, Improved Speaker Adaptation using Speaker Dependent Feature Projections, *Automatic speech Recognition and Understanding*, 2003, ASRU '03. 2003 *IEEE* Workshop on St. Thomas, VI, USA Nov. 30-Dec. 3, 2003, Piscataway, NJ, USA, IEEEE, Nov. 30, 2003, pp. 273-278, XP010713320, ISBN: 978-0-7803-7980-0.

Saon, et al, Linear Feature Space Projections for Speaker Adaptation, 2001 IEEE International conference on Acoustics, Speech and Signal Processing Proceedings (ICASSP), vol. 1, May 7, 2001-May 11, 2001, pp. 325-328, XP010803061, Salt Lake City, UT, ISBN: 978-0-7803-7401-8.

European Patent Office, Authorized Officer Brigitte Chiarizia, International Search Report and Written Opinion, PCT/US2008/062322, mailed Jul. 22, 2008, 14 pages.

European Patent Office, Authorized Officer Regis Quelavoine, International Search Report and Written Opinion, PCT/US2007/071893, mailed Jul. 31, 2008, 17 pages.

* cited by examiner

US 8,386,254 B2

MULTI-CLASS CONSTRAINED MAXIMUM LIKELIHOOD LINEAR REGRESSION

This application claims priority from U.S. Provisional Patent Application 60/915,971, filed May 4, 2007, which is incorporated herein by reference.

FIELD OF THE INVENTION

The invention generally relates to automatic speech recognition (ASR), and more specifically, to adaptation of feature space transformations for ASR.

BACKGROUND ART

A speech recognition system determines representative text corresponding to input speech. Typically, the input speech is processed into a sequence of digital frames. Each frame can be thought of as a multi-dimensional vector that represents various characteristics of the speech signal present during a short time window of the speech. In a continuous recognition system, variable numbers of frames are organized as "utterances" representing a period of speech followed by a pause, which in real life loosely corresponds to a spoken sentence or phrase.

The system compares the input utterances to find acoustic models that best match the frame characteristics and determine corresponding representative text associated with the acoustic models. Modern acoustic models typically use Hidden Markov Models and they model speech sounds (usually phonemes) using mixtures of Gaussians. Often these phoneme models represent phonemes in specific contexts, referred to as PELs (Phonetic Elements), e.g. triphones or phonemes with known left and/or right contexts.

State sequence models can be scaled up to represent words as connected sequences of acoustically modeled phonemes, and phrases or sentences as connected sequences of words. When the models are organized together as words, phrases, and sentences, additional language-related information is also typically incorporated into the models in the form of language modeling.

The words or phrases associated with the best matching model structures are referred to as recognition candidates or hypotheses. A system may produce a single best recognition candidate—the recognition result—or a list of several hypotheses, referred to as an N-best list. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

Speech recognition can be classified as being either speaker independent or speaker dependent. The models in a speaker dependent system are specific to an individual user. Known speech inputs from the user are used to adapt a set of initially generic recognition models to specific speech characteristics of that user. The speaker adapted models form the basis for a user profile to perform speaker dependent or speaker adapted speech recognition for that user.

Speaker dependent systems traditionally use an enrollment procedure to initially create a user profile and a corresponding set of adapted models before a new user can use the system to recognize unknown inputs. During the enrollment procedure, the new user inputs speech corresponding to a known source script that is provided. During this enrollment process, the acoustic models are adapted to the specific speech characteristics of that user. These adapted models form the main portion of the user profile and are used to perform post-enrollment speech recognition for that user. Further details regarding speech recognition enrollment are provided in U.S. Pat. No. 6,424,943, entitled "Non-Interactive Enrollment in Speech Recognition," which is incorporated herein by reference.

Speaker dependent speech recognition systems running on modern desktops use adaptation at many simultaneous levels to improve accuracy and recognition speed. Some of these techniques, such as cepstral normalization, histogram normalization, or speaker adaptive training (SAT) operate directly on the input speech feature stream. Others, such as maximum likelihood linear regression (MLLR) and maximum a posteriori parameter estimation (MAP) operate by transforming speech recognition models to better fit the incoming signal.

One typical use of MLLR adaptation in speech recognition has been to transform sets of Gaussian mixtures models which share some property, such as the same center phoneme. These sets are referred to as "classes," and MLLR in this context can be thought of as class-based MLLR.

One specific form of MLLR, constrained MLLR (cMLLR) has been used for several years in state of the art recognition systems. In contrast to generic MLLR, cMLLR constrains the linear transformations to modify both the model means and variances in a consistent fashion. The resulting transformation can then be inverted and applied in the feature space rather than in the model space. In specific example of the use of cMLLR uses an online unsupervised feature space adaptation (OUFA) technique, described further in U.S. patent application Ser. No. 11/478,837, entitled "Non-Enrolled Continuous Dictation," the contents of which are incorporated herein by reference.

Most server-based speech recognition systems avoid most types of adaptation, and particularly model-space adaptation, but FIG. 1 shows an example of a multiple speaker application using OUFA and a single class cMLLR transform. During initial enrollment, an enrollment speech input from a new user is used to perform MLLR adaptation of an initial speaker independent acoustic model (SIAM) to generate a speaker dependent acoustic model (SDAM) so that the system has one such SDAM for each of the N speakers registered with the system, $SDAM_1$-$SDAM_N$. The enrollment speech input is also used to perform single class cMLLR adaptation wherein the inverse cMLLR transform is used to adapt feature processing blocks—speaker dependent SAT models (one of the blocks $SAT_1$-$SAT_N$) and OUFA models (one of the blocks $OUFA_1$-$OUFA_N$) for that speaker.

After enrollment, unknown input speech from a given user is initially processed by a speaker dependent front end (one of the blocks $SDFE_1$-$SDFE_N$) to produce a set of speech features representative of the speech input. These features are then processed by the speaker dependent blocks SAT and OUFA for that user, and input to the recognition engine. The recognition engine compares the input speech features to the SDAM for that user as constrained by the recognition language model and search algorithm to produce a representative recognition output.

SUMMARY OF THE INVENTION

A method of speech recognition converts an unknown speech input into a stream of representative features. The feature stream is transformed based on speaker dependent adaptation of multi-class feature models, for example, by constrained maximum likelihood linear regression (cMLLR). Then automatic speech recognition is used to compare the transformed feature stream to multi-class speaker independent acoustic models to generate an output representative of the unknown speech input.

In specific embodiments, the converting an unknown speech input is based on a speaker dependent front end. Transforming the feature stream may include using speaker adaptive training (SAT) and/or online unsupervised feature space adaptation (OUFA). Converting an unknown speech input and transforming the feature stream may be performed by a local client, and the automatic speech recognition may be performed by a remote server. The multi-class speaker independent acoustic models may specifically include hidden Markov models which use Gaussian mixture components. The speech recognition may specifically use scaled integer arithmetic.

DETAILED DESCRIPTION OF SPECIFIC EMBODIMENTS

Various embodiments of the present invention are directed to techniques to bring the performance benefits of MLLR to server-based speech recognition by computing different cMLLR transforms for different classes of PELs. The inverse transforms are applied to the input feature stream, producing as output multiple transformed copies of the input. These transformed features are compared with (untransformed) Gaussian mixture models for each phoneme class.

Using these untransformed Gaussian mixture models allows the acoustic models to be shared among different users. This sharing substantially decreases the amount of memory needed for a speaker dependent system, both on disk and in memory. For example, in a typical implementation, the size of the transformations is 216 kB, while the size of the Gaussian mixture models is 15 Mb. A particular advantage of multi-class cMLLR is that it allows a simultaneous multi-user system to share memory for Gaussian mixture models across users. Since Gaussian mixture models are a large part of a user's memory budget, this can result in substantial memory savings in systems which recognize speech for multiple simultaneous users.

Figure 1:
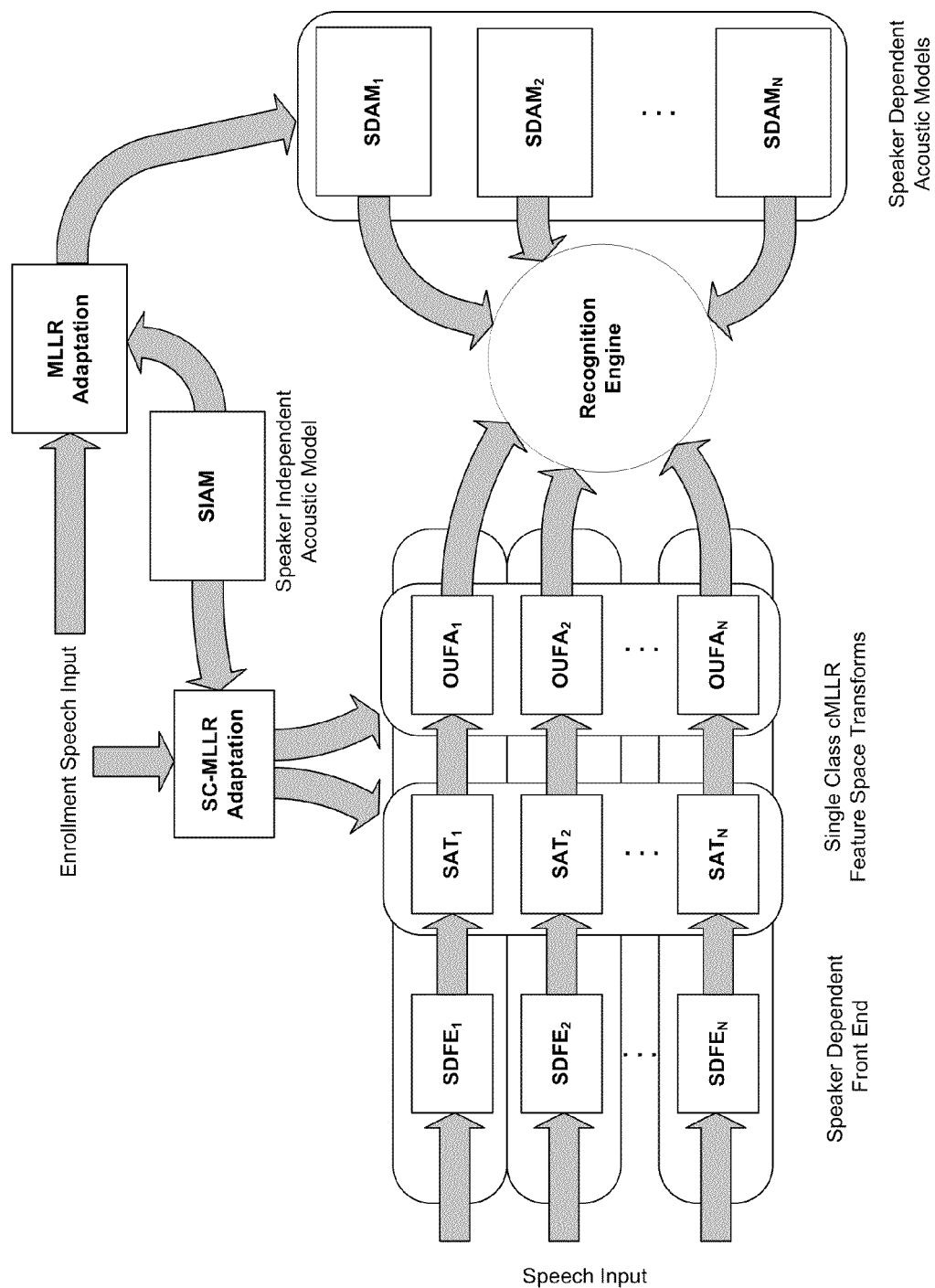
FIG. 1 shows an example of a multiple speaker application using OUFA and a single class cMLLR transform.
Figure 2:
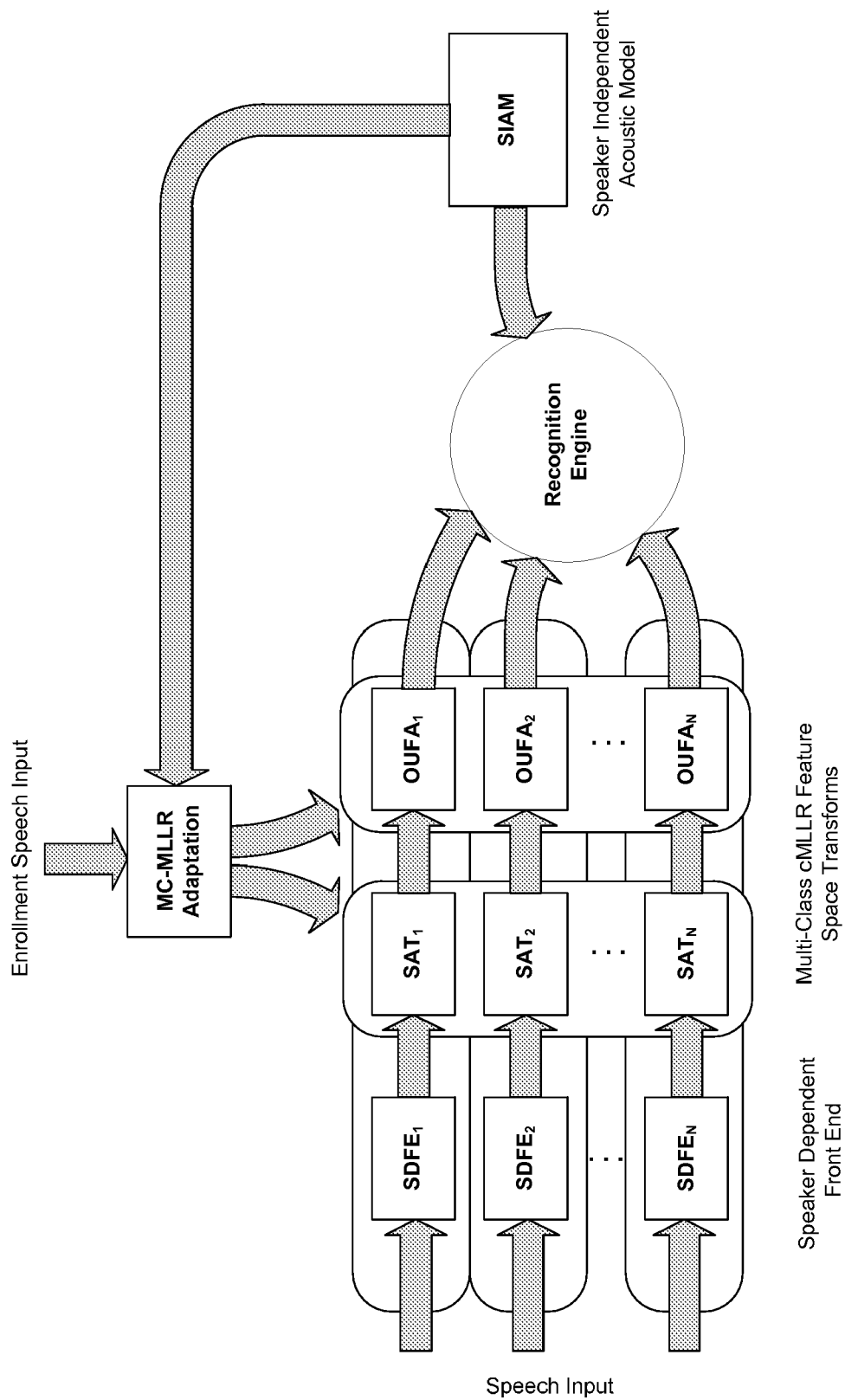
FIG. 2 shows an embodiment of the present invention using multi-class cMLLR transforms.

FIG. 2 shows an embodiment of the present invention using multi-class cMLLR transforms. The initial enrollment is used to perform a multi-class inverse cMLLR adaptation of speaker dependent feature space processing blocks—speaker dependent SAT and OUFA modules for that speaker. The Gaussian mixture components in the Speaker Independent Acoustic Model (SIAM) are not adapted for individual speakers.

After enrollment, unknown input speech from a given user is initially processed by a speaker dependent front end (SDFE), speaker adaptive training (SAT), and online unsupervised feature space adaptation (OUFA) for that user. The resulting stream of representative speech features is input to the recognition engine. The recognition engine compares the input speech features to the system SIAM to perform speech recognition as constrained by the recognition language model and search algorithm and produce a representative recognition output.

A formal mathematical development of single class cMLLR is presented in Gales, "Maximum Likelihood Linear Transformations for HMM-Based Speech Recognition", Tech. Report, CUED/FINFENG/TR291, Cambridge Univ., 1997, which is incorporated herein by reference. From Gales, a set of equations can be developed for multi-class cMLLR adaptation data $G_c^{(i)}$ and $k^{(i)}$:

$$G_c^{(i)} = \sum_{m=1}^{M_C} \frac{1}{\sigma_i^{(m)2}} \sum_{\tau=1}^{T_C} \gamma_m(\tau) \zeta(\tau) \zeta(\tau)^T$$

and, $$k^{(i)} \sum_{m=1}^{M_C} \frac{1}{\sigma_i^{(m)2}} \mu_i^{(m)} \sum_{\tau=1}^{T_C} \gamma_m(\tau) \zeta(\tau)^T$$

where: i is the feature dimension index
m is the Gaussian component index
$\mu_i^{(m)}$ is the $i^{th}$ mean parameter of Gaussian m
$G_i^{(m)}$ is the $i^{th}$ variance parameter of Gaussian m
$\xi(\tau)$ is the feature vector at time $\tau$, and
$\gamma_m(\tau)$ is the posterior probability at time $\tau$ for Gaussian m.

One implementation consideration in multi-class cMLLR is how to handle smoothing. Smoothing is used when the training data does not contain enough examples of some classes to well specify the transformation for that class. One approach is relevance smoothing where the adaptation data $G_c^{(i)}$ and $k^{(i)}$ for each class initially is added together:

$$\overline{G}^{(i)} = \sum_{c=1}^{C} G_c^{(i)} \text{ and } \overline{k}^{(i)} = \sum_{c=1}^{C} k_c^{(i)}$$

where C=the number of classes. Then, the total statistics are used to weight the per-class adaptation data $G_c^{(i)}$ and $k^{(i)}$:

$$\tilde{G}_c^{(i)} = \frac{r}{N} \overline{G}^{(i)} + G_c^{(i)}$$

$$\tilde{k}_c^{(i)} \frac{r}{N} \overline{k}^{(i)} + k_c^{(i)}$$

where $0 \leq c < C$, N is the total number of frame counts, and r is a relevance factor.

In some embodiments, there could be some performance losses due to replacing MLLR transforms with cMLLR. For example, some tests have shown a relatively small accuracy loss of about 1.8% relative word error rate (WER) on one specific short messaging service (SMS) data set.

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system, for example, as a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of speech recognition comprising:
    converting an unknown speech input into a stream of representative features;
    transforming the feature stream based on speaker dependent constrained maximum likelihood linear regression (cMLLR) adaptation of multi-class feature models having a plurality of sets of feature models wherein feature models in a given set share a common characteristic property and a common cMLLR transform such that different cMLLR transforms are used for different sets of feature models, and wherein the adaptation based on cMLLR includes use of relevance smoothing by obtaining per-class adaption data from a weighted adding using a relevance factor and total number of frame counts to add initial per-class adaptation data to a sum of adaptation data of all classes; and
    using automatic speech recognition to compare the transformed feature stream to multi-class speaker independent acoustic models to generate an output representative of the unknown speech input.

2. A method according to claim 1, wherein the converting an unknown speech input is based on a speaker dependent front end.

3. A method according to claim 1, wherein the transforming the feature stream includes using speaker adaptive training (SAT).

4. A method according to claim 1, wherein the transforming the feature stream includes using online unsupervised feature space adaptation (OUFA).

5. A method according to claim 1, wherein the converting an unknown speech input and the transforming the feature stream are performed by a local client, and the using automatic speech recognition is performed by a remote server.

6. A method according to claim 1, wherein the multi-class independent acoustic models include hidden Markov models.

7. A method according to claim 6, wherein the hidden Markov models use Gaussian mixture components.

8. A method according to claim 1, wherein the speech recognition uses scaled integer arithmetic.

9. A system for speech recognition comprising:
    means for converting an unknown speech input into a stream of representative features;
    means for transforming the feature stream based on speaker dependent constrained maximum likelihood linear regression (cMLLR) adaptation of multi-class feature models having a plurality of sets of feature models wherein feature models in a given set share a common characteristic property and a common cMLLR transform such that different cMLLR transforms are used for different sets of feature models, and wherein the adaptation based on cMLLR includes use of relevance smoothing by obtaining per-class adaptation data from a weighted adding using a relevance factor and total number of frame counts to add initial per-class adaptation data to a sum of adaptation data of all classes; and
    means for using automatic speech recognition to compare the transformed feature stream to multi-class speaker independent acoustic models to generate an output representative of the unknown speech input.

10. A system according to claim 9, wherein the means for converting an unknown speech input is based on a speaker dependent front end.

11. A system according to claim 9, wherein the means for transforming the feature stream includes means for using speaker adaptive training (SAT).

12. A system according to claim 9, wherein the means for transforming the feature stream includes means for using online unsupervised feature space adaptation (OUFA).

13. A system according to claim 9, wherein the means for converting an unknown speech input and the means for transforming the feature stream are at a local client, and the means for using automatic speech recognition is at a remote server.

14. A system according to claim 9, wherein the multi-class independent acoustic models include hidden Markov models.

15. A system according to claim 14, wherein the hidden Markov models use Gaussian mixture components.

16. A system according to claim 9, wherein the means for using speech recognition includes means for using scaled integer arithmetic.

* * * * *